Jan. 27, 1970  R. D. FOSKETT  3,492,515
STEPPING MOTOR WITH NUTATING GEAR
Filed Nov. 24, 1967  2 Sheets-Sheet 1

ROGER D. FOSKETT
INVENTOR.

BY
ATTORNEY.

Jan. 27, 1970   R. D. FOSKETT   3,492,515
STEPPING MOTOR WITH NUTATING GEAR
Filed Nov. 24, 1967   2 Sheets-Sheet 2

ROGER D. FOSKETT
INVENTOR.

BY
Nicholas A. Pandiscio
ATTORNEY.

United States Patent Office 3,492,515
Patented Jan. 27, 1970

3,492,515
STEPPING MOTOR WITH NUTATING GEAR
Roger D. Foskett, Winchester, Mass., assignor to Vibrac Corporation, Chelmsford, Mass., a corporation of Massachusetts
Filed Nov. 24, 1967, Ser. No. 685,601
Int. Cl. H02k 37/00, 7/116
U.S. Cl. 310—49                                19 Claims

ABSTRACT OF THE DISCLOSURE

A bidirectional, electromagnetically-controlled stepping motor which consists of two face gears, each having a different number of teeth, with one gear fixed and the other coupled to a drive shaft. The shaft-coupled gear is selectively displaced, by electromagnetic means, so that its teeth locally engage and mesh with teeth of the fixed gear. This point of local contact is advanced by the shaft-coupled gear wobbling around the fixed gear, causing the drive shaft to rotate with an intermittent or stepped motion.

---

This invention relates to electric motors, and more specifically to an electromagnetically-operated stepping motor.

Stepping motors are finding wide application in the operation and control of actuators, tape transporters, and digital computers, to name but a few devices. These motors are especially useful because they provide precise angular indexing and can operate bidirectionally. While previously-available units have proven satisfactory in performance, the need for lower cost and simpler construction, without an accompanying loss in precision and performance, has been particularly desirable.

Accordingly, a primary object of the present invention is to provide an improved, high response stepping motor capable of bidirectional operation.

Another object is to provide a low cost, improved bidirectional, pulse-operating stepping motor having ease of accessibility for assembly.

Another object is to provide an improved, high repsonse stepping motor having high torque output.

A further object is to provide an improved stepping motor that is operable over a wide pulse frequency range.

A still further object is to provide an improved, pulse-operated motor having a highly efficient magnetic circuit and high precision of angular indexing.

A more specific object is to provide an improved and simplified bidirectional, pulse-operated stepping motor in which energization by a D.C. voltage in a programmed manner generates a nutating motion that is employed to provide precise angular indexing of a rotary output shaft through an adjustable speed range.

The foregoing and other objects of the present invention are achieved by a preferred construction comprising a rotatable shaft and two confronting gears having teeth on facing surfaces with the number of teeth on one gear differing by one from the number of teeth on the other gear. One gear is fixed, while the second gear, which is formed of a magnetically permeable material, is attached to the shaft by a flexible torque-transmitting coupling arrangement that permits it to wobble or nutate relative to the shaft. The construction further includes electromagnetic means operative to locally tilt the shaft-coupled gear toward the fixed gear so as to generate a wobbling or nutating motion of the former in which successive teeth thereof engage successive teeth of the latter and thereby impart stepped rotational motion to the shaft. In the preferred embodiment, the electromagnetic means comprises a plurality of coils coaxially mounted in a circular array about the drive shaft with successive coils being successively energized to produce a gear-tilting force that advances stepwise in a circular orbit around the shaft, with the result that the shaft-coupled gear undergoes a wobbling or nutating motion with the location of the tilting force at any given instant determining the point of contact between the two gears. In normal operation, the coils are sequentially energized by pulses, with the pulse frequency, i.e., pulse repetition rate, determining the speed of rotation of the shaft. The preferred embodiment is constructed so that the magnetic fields are localized at the gear teeth and the torque-transmitting coupling is located so as to assure proper meshing of the gear teeth as the shaft-coupled gear wobbles.

The foregoing and other objects, together with the attendant advantages of the present invention will become more readily apparent from the following detailed specification, when considered with the accompanying drawings, wherein.

Figure 2:
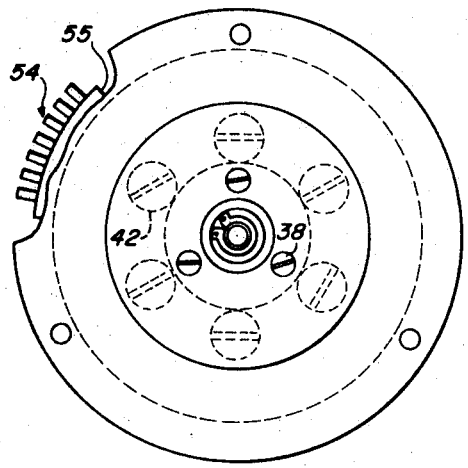
FIG. 2 is an end view of the stepping motor of the preferred embodiment looking from left to right in FIG. 1.
Figure 1:
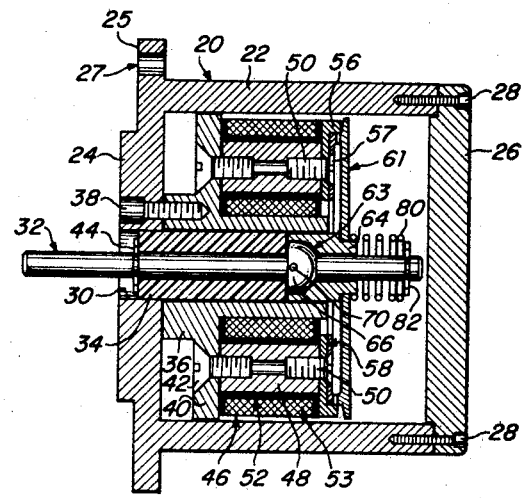
FIG. 1 is a longitudinal sectional view of a preferred embodiment of the present invention.

Referring now to FIGS. 1 and 2, the illustrated embodiment includes a housing 20 comprising a cylindrical side wall 22 and an end wall 24 at one end. The opposite end of the housing 20 is closed off by a cover or end plate 26 which is releasably secured thereto by a plurality of screws 28. The end wall 24 is formed with a centrally located hole 30 to accommodate a drive shaft 32 and includes a flange 25 having a plurality of spaced holes 27 through which screws can pass to mount the housing to a suitable support. Shaft 32 is journalled in a cylindrical non-magnetic sleeve bushing 34 that is press-fitted in a tubular support member 36 which is secured to end wall 24 by means of a plurality of screws 38. Support member 36 is made of magnetically permeable material and includes a flange 40 having a plurality of circularly arranged counterbored holes adapted to receive screws 42. A snap ring 44, seated within a first groove in shaft 32, abuts the outer end of bushing 34 to prevent end-wise movement of the shaft 32 toward cover 26.

Coaxially mounted to the support member 36 are a plurality of electromagnets 46. The illustrated embodiment has six electromagnets which are mounted in a circular array about shaft 32. Each includes first a hollow core 48 made of magnetically permeable material and tapped at both ends to receive screws 42 and 50. Surrounding each core 48 is a plastic bobbin 52 about which is wound a coil 53. The electromagnets 46 are individually connected to support member 36 by the screws 42 which pass through the support member into the cores 48. The ends of the coils are connected to terminals 54 provided on a conventional multi-terminal connector 55 attached to the housing as shown in FIG. 2. In the illustrated embodiment connector 55 has seven terminals, one of which serves as a common for all of the coils.

Figure 3:
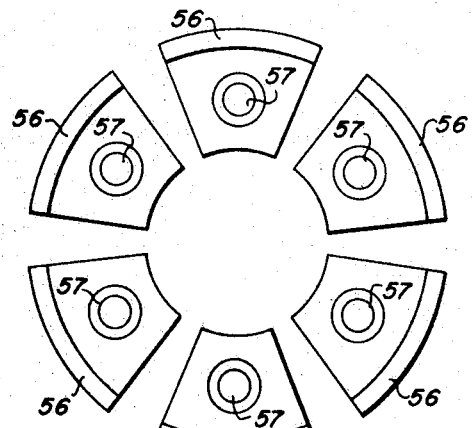
FIG. 3 is an end view on an enlarged scale showing the preferred arangement of the pole pieces used in the invention.
Figure 1A:
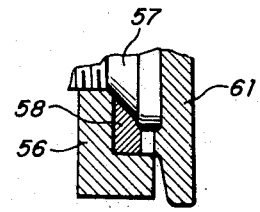
FIG. 1A is an enlargement of a portion of FIG. 1.

Connected to the opposite end of each core is a magnetically permeable pole piece 56. A counterbored hole 57 in the center of each pole piece 56 receives a screw 50 which secures it to the corresponding core. Preferably, but not necessarily, these pole pieces are formed by cutting a ring of magnetically permeable material into eight equal segments, two of which are discarded. Each of the six remaining pieces, when mounted on a core 48, is separated from each adjacent pole piece by a gap of about 15 degrees (see FIG. 3). This gap minimizes flux leakage between the poles. To further control flux distribution and density, these pole pieces 56 are sized so that their outer edges extend along a common circle to which the several coils are tangent, and their inner edges are spaced from support member 36.

Figure 5:
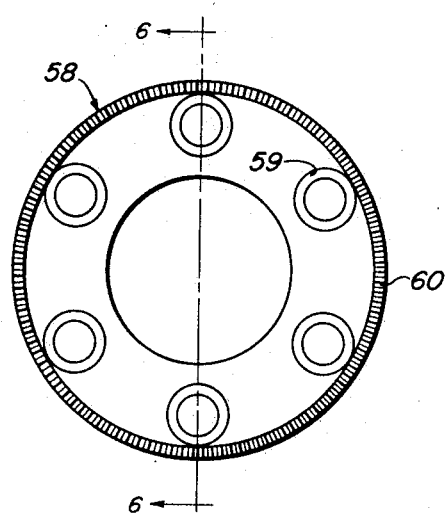
FIG. 5 is an elevational view of the fixed gear used in the invention.
Figure 6:
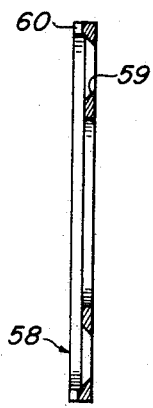
FIG. 6 is a longitudinal sectional view taken along line 6—6 of FIG. 5.

The screws 50 also serve to secure a gear 58 in fixed coaxial relation with shaft 32 and the circular array of pole pieces 56. As shown in FIGS. 5 and 6, this gear 58 is formed as an annular ring with six equally spaced counterbored holes 59 which receive screws 50. The gear also has a plurality of teeth 60 cut on one face at its edge. These teeth are equally spaced and are cut along radii of the gear. The gear 58 is formed of a non-magnetic material, preferably aluminum.

Figure 7:
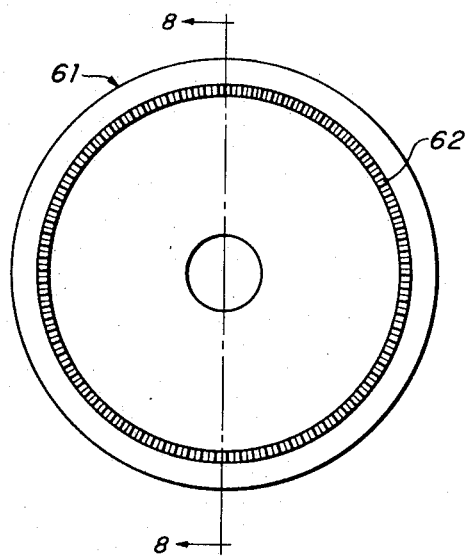
FIG. 7 is an elevational view of the rotatable gear used in the present invention.
Figure 8:
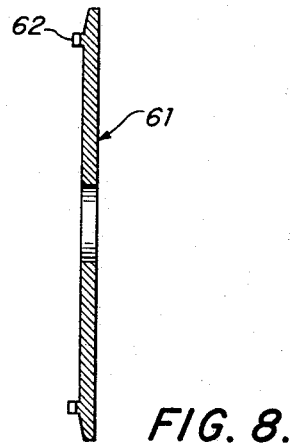
FIG. 8 is a longitudinal sectional view taken along line 8—8 of FIG. 7.

The device also includes a second annular gear 61 which is coupled to shaft 32 as described below. Gear 61 has a center hole of predetermined size and also is formed with a plurality of teeth 62 cut on one face (see FIGS. 7 and 8). Gear 61 is the wobbling or nutating gear. It is made of a magnetically permeable material and is positioned substantially coaxially to shaft 32, with its teeth confronting the teeth of fixed gear 58. Gear 61 is mounted so that when the electromagnets are deenergized the average distance between their pitch planes is at least about ½ of the tooth depth. As herein employed the term "pitch plane" is a plane through the teeth which is halfway between the tips and the bottoms of the teeth. When a particular electromagnet 46 is energized it establishes a magnetic field, localized at the gear teeth of the coupled gear 61, which forces the coupled gear 61 to tilt toward the energized electromagnet to bring its teeth into local contact with the teeth of fixed gear 58.

To produce the wobbling or nutating motion, the number of teeth on the two gears must differ. In a preferred embodiment, the shaft-coupled gear 61 has "$n$" teeth while the fixed gear 58 has "$n+1$" teeth. Thus, when successive coils are successively energized, the coupled gear will tilt and "walk" with a nutating motion around the fixed gear 58, causing rotation of shaft 32. In each nutation cycle, the shaft-coupled gear 61 (and thus shaft 32) will rotate through one tooth pitch, and the number of teeth $n$ on the gear 61 will determine the reduction ratio of the power transmission. Thus if $n$ is 100, the reduction ratio will be 100:1. In other words, the shaft 32 will rotate once for each 100 nutating cycles of gear 61. In practice it is preferred that $n$ be at least 100 in order to provide a smooth stepping action. However, the number of teeth selected can be varied as desired.

For smooth meshing of teeth, both gears should have identical tooth pitch and depth, with the sides of the teeth cut along radii of the respective gear. As a result, fixed gear 58, having one additional tooth, will have a diameter slightly larger than that of shaft-coupled gear 61. This difference in diameter is magnified on tilting of gear 61, since tilting causes certain of the teeth (depending upon the axis of tilt) to move toward shaft 32 as well as toward gear 58. Therefore, in order for the teeth of the two gears to mesh properly, when gear 61 is tilted toward gear 58, it also must be laterally displaced toward the point of tooth engagement. In effect, this is accomplished by employing a torque-transmitting coupling 63 between gear 61 and shaft 32 which permits the center of the gear to rotate in a circular orbit around the axis of the shaft.

In the illustrated embodiment the torque-transmitting coupling 63 is a modified ball and socket joint and comprises a cylindrical gear post 64 adapted to function as a socket and a cooperating member 66 adapted to function as a ball in the socket. Referring to FIG. 1, member 66 is in the form of a section of a sphere, with a through hole to accommodate shaft 32 and a flat end surface that abuts the adjacent end of bushing 34. Member 66 is secured to shaft 32 by a diametrically extending pin 70 that passes through both of them and projects from opposite sides of member 66.

Figure 4:
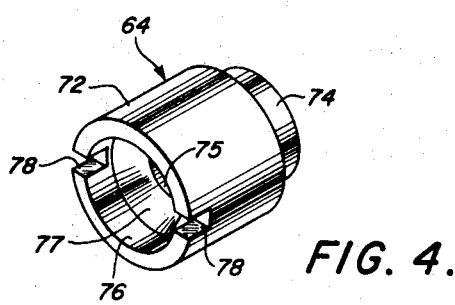
FIG. 4 is a perspective view of the pivotable gear post used in the present invention.

Referring to FIGS. 1 and 4, the gear post 64 is cylindrical with its outer surface stepped so as to provide a first portion 72 sized to tilt within supporting member 36 and a reduced-diameter second portion 74 which fits in the center hole of gear 61, the latter being secured normal to the axis of gear post 64. The portion 72 of the gear post is sufficiently smaller than supporting member 36 to allow the gear 61 to tilt to the extent required for its teeth to fully engage the teeth of gear 58 in the manner hereinafter described. For example, where the inside diameter of member 36 is .50", the O.D. of gear post 64 is smaller by about .010". Gear 61 and gear post 64 may be secured together by a shrink fit or by other suitable means, e.g., screws, cementing, soldering, welding, etc. In effect gear post 64 and gear 61 constitute a unitary assembly with gear post 64 functioning as the hub of gear 61. Gear post 64 also has an axial bore 75 with a diameter slightly oversize with respect to shaft 32. Axial bore 75 is counterbored at one end to provide a cylindrical inner surface 76 which has a radius larger than member 66, and a tapered portion 77 having a spheroidal curvature (or conical taper) so as to seat on member 66 (see FIG. 1).

Gear post 64 also is slotted at its counterbored end so as to provide two diametrically opposed slots 78 which receive the ends of pin 70. The width of the slots (the dimension measured along a plane extending at a right angle to the diameter on which the slots are located) exceeds the diameter of pin 70 just enough to allow the gear post to pivot about the pin's axis, so that torque is transmitted from gear 61 to the shaft 32 through pin 70 with no lost motion in a circumferential direction. The depth of slots 78, i.e., the axially extending dimension, is substantially greater than the diameter of pin 70 to allow movement of the gear post 64 sufficient for gear 61 to tilt in a plane common to the axes of pin 70 and shaft 32. In this connection it is to be noted that gear post 64 is made so that when member 66 engages the seat 77, the slotted end of the gear post is spaced from bushing 34 by an amount sufficient to allow the gear post to tilt gear 61 into and out of engagement with gear 58.

As shown in FIG. 1, a coil spring 80 coaxially surrounds shaft 32 and is held against the shaft-coupled gear 61 by a retaining ring 82. The latter is seated within a second groove in shaft 32. This spring serves to maintain the shaft-coupled gear 61 in contact with gear 58 when the electromagnets are de-energized. In other embodiments the coil spring 70 can be replaced by a bellows, leaf spring, diaphragm or a like flexible biasing member.

It is to be noted that with the ball and socket connection described above the point about which gear 61 nutates is located to one side of both gears, with gear 58 being closest to the point of nutation. This is in order to achieve proper lateral displacement of gear 61. Moving the ball and socket connection away from both gears, i.e., to the left in FIG. 1, will increase the lateral displacement of gear 61 for a given angle of tilt. The exact distance between the point of nutation and gear 58 depends, of course, on gear diameter.

Figure 9:
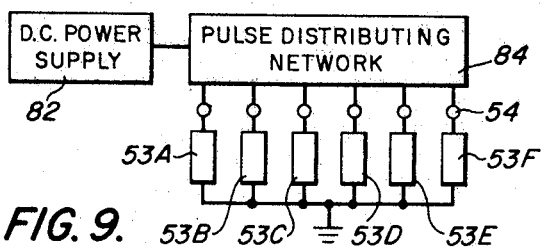
FIG. 9 is a schematic circuit diagram illustrating how motors constructed in accordance with the present invention may be energized and controlled.

A stepping motor constructed in accordance with this invention may be energized and controlled in various ways. FIG. 9 schematically illustrates one suitable drive circuit for the motor. This circuit includes a D.C. power supply 82 that drives a pulse distributing network 84 having six output leads that are individually connected to coils 53 via the terminals 54 of connector 55. The pulse distributing network operates to sequentially switch the coils and thereby successively energize the six pole pieces for brief intervals determined by switching frequency. By way of example, but not limitation, the pulse distributing network may take the form of a conventional ring counter of the type employing a flip-flop in each stage, and an array of parallel connected power transistors connecting the power supply with the coils, successive pulses from the ring counter serving to switch from one transistor to another.

Alternatively, the pulse distributing network could take the form of a commutator switch consisting of six stationary contacts, each connected to one of the coils 53, and a suitable contactor which is connected to the D.C. power supply and moves from one stationary contact to another to sequentially energize the coils. The moveable contactor of the commutator switch may be driven by an external commutating source, e.g. a motor; or it may be connected so as to render the motor self-commutating.

Operation of the motor will now be briefly summarized. Successive impulses from the pulse distributing network cause successive ones of coils 53 to be briefly energized. Each energized coil provides a main flux path which passes through an adjacent portion of the shaft-coupled gear 61, which, in the nature of magnetically permeable material, attempts to shorten the flux path by moving closer to the adjacent energized pole piece 56. As gear 61 tilts toward the energized pole, it contacts the face of fixed gear 58, causing the teeth of both gears to locally mesh. When an adjacent coil becomes successively energized, the coupled gear wobbles in the direction of the adjacent coil to the extent of causing other teeth to become engaged while the teeth originally engaged separate as the first coil is de-energized. This gear motion is repeated as successive coils are pulsed. The result is that shaft-coupled gear 61 wobbles around the fixed gear 58, causing the shaft to which gear 61 is coupled to rotate with a precise angular indexing or stepping motion.

When the magnetically-permeable material of core pieces 56 is a material having low magnetic remanence, it is important that each new pulse be initiated so that the energization of one coil begins before the previously energized coil is de-energized. This is necessary to assure continuous control of the position of gear 61. However, if the magnetic material of core pieces 56 has substantial remanence, the next pulse need not be started before the preceding coil is completely de-energized.

The coils can be energized one at a time, as mentioned above, or in pairs, or singly and in pairs. When they are energized in pairs, the energization cycle is as follows: Step 1, coils 53A and 53B are energized; step 2, coil 53A is de-energized and coil 53C is energized; step 3, coil 53B is de-energized and coil 53D is energized; etc. Pulsing pairs of coils alters the point of local contact between the two coils to a position substantially between the two coils instead of at the coils which occurs when the coils are pulsed singly. To create local points of contact between the two gears at positions between the coils and at the coils, thereby doubling the number of points of contacts, the coils are alternately pulsed one-at-a-time and in pairs. The energization cycle is then as follows: Step 1, energize coil 53A; step 2, energize coil 53B; step 3, de-energize coil 53A; step 4, energize coil 53C; step 5, de-energize coil 53B, etc. The result of this energization cycle is a smoother wobbling motion. This overlapping of on-time for successive coils may be done in various ways, e.g., by using a mechanical commutator switch designed so that the moveable contactor can engage another stationary contact before it has left a previous stationary contact. This can be accomplished, for example, by staggering the stationary contacts in two parrallel rows, with the moveable contactor arranged to wipe contacts in both rows.

Advantages of the above described invention are several. From the manner in which the components are arranged within the housing, it is apparent that the motor can be easily assembled and can be compact. The entire apparatus can be removed from the housing by removing the cover, and releasing the screws which hold support member 36. Moreover, the support member and attached electromagnets constitute a discrete sub-assembly that is easily attached to the housing.

Bidirectional operation of the motor is achieved by reversing the coil energization sequence. Angular indexing is precise. Rotating shaft speed is accurately controlled by the pulse frequency. Moreover, a nutating motion is achieved without the need for a flexible nutating member which, by its design, may appreciably add to the motor's cost.

It should be appreciated that the motor can be made in various sizes, and that the size of the gears and the number and size of the teeth on each gear can be varied as desired. Moreover the tilting gear 61 can be made in two concentric parts with the center non-magnetic and the outer margin portion magnetic. Gear 58 also can be made of two or more concentric parts.

The number of electromagnets used can also be varied, although operation with less than three electromagnets is not suggested. Arrangement of the pole pieces is such that the point of narrowest gap with respect to tiltable gear 61 occurs at the periphery of the tiltable gear 61, so as to maximize the force of the field on the tiltable gear 61. The motor can also be double-ended, with the drive shaft extended to project through cover plate 26.

Various other modifications and variations also are believed obvious to persons skilled in the art. Thus, for example, the pole pieces could be formed by a manufacturing technique other than the one described, e.g., by stamping, machining and the like, and could have a laminated construction. Other parts of the magnetic circuit, e.g., the cores 48, the support member 36, and the gears 58 and 61 also may have a laminated construction. Using a laminated construction reduces eddy currents and hence causes the magnetic field produced by a given coil to decay more rapidly when the coil is deenergized, with the result that the maximum pulse frequency range is increased. Furthermore the torque-transmitting coupling 63 may be made to take other forms adapted to provide the requisite lateral displacement of gear 61 when it tilts. It is also contemplated that a second gear arrangement as above described may be provided for driving shaft 32 with the second set of gears being driven by the electromagnets 46 described above or by a duplicate array of electromagnets energized in synchronism with the first array. The advantage of this dual modification is that it provides added torque and less vibration. Still another modification consists of making the cores 48 (or the support member 36 or the pole pieces 56) of a magnetic material that has high retentivity, or in the alternative, making these members of a material that is permanently magnetized. The object of this further modification is to provide positive magnetic latching between the two gears when all of the coils are deenegrized, with the result that the shaft 32 will be locked against rotation. This modification need not be used if the two gears have a large number of teeth, in which case when all of the electromagnets are deenergized, enough teeth will remain engaged under the force of spring 80 to prevent rotation of the output shaft 32 by the torque resulting from momentum of the particular device which is driven by shaft 32. It is to be appreciated also that in practice the preferred embodiment described above and illustrated in the drawings may exhibit a limited amount of retentivity, with the result that magnetic latching may exist for a brief interval of time after all of the coils are deenergized. Therefore, it is to be understood that the invention is not limited in its application to the details of construction and arrangement of parts specifically de-

I claim:

1. A stepping motor, which comprises:

a housing having an opening in one end;

a drive shaft mounted for rotation about its major axis within said housing, one end of said drive shaft extending through said opening;

a first rotatable gear within said housing, said first gear having a plurality of teeth on one face thereof;

a torque-transmitting coupling between said first gear and said shaft adapted to permit tilting of said first gear relative to said shaft, said torque-transmitting coupling comprising a ball located on said shaft intermediate the ends thereof, said ball rotatable with said shaft, a gear post to which said first gear is secured so as to rotate therewith, said gear post having an axial bore through which said drive shaft extends, said bore being oversize with respect to said shaft so that said post and gear are tiltable with respect to said shaft, said post at one end of said axial bore having a socket shaped to seat on said ball, means connecting said ball and post for locking said shaft against rotation on its axis relative to said post, the end of said shaft opposite to said one end thereof projecting from said post beyond the plane of said first gear, a compression coil spring mounted on and surrounding said opposite end of said shaft, means on said opposite end of said shaft holding said spring under compression so that said spring urges said gear post and first gear toward said ball to hold said ball and socket in engagement with each other;

a second stationary gear within said housing, said second gear having a plurality of teeth on one face differing in number from the teeth on said first gear, said second gear disposed in coaxial relation to said shaft so that its teeth are face to face with the teeth of said first gear; and gear-tilting means within said housing for causing said first gear to wobble substantially symmetrically about the axis of said shaft so that successive ones of its teeth successively mesh with successive teeth of said second gear to produce rotation of said shaft.

2. A stepping motor as recited in claim 1 in which at least part of said first gear is formed of a magnetic material and said second gear is formed of a non-magnetic material.

3. A stepping motor as recited in claim 1, in which the sides of the teeth of each gear extend along radii of said each gear.

4. A stepping motor as recited in claim 1 in which the teeth on said first and second gears have identical pitches and slopes at the point of engagement.

5. A stepping motor as recited in claim 1 in which the opposite end of said housing is open, and further including a cover releasably secured to said housing closing off said opposite end.

6. A stepping motor as defined by claim 1 wherein said means for causing said first gear to wobble comprises a tubular member surrounding a portion of said shaft, said tubular member being mounted to said housing and having a radially extending flange, a plurality of selectively energizable electromagnets, means releasably securing said electromagnets to said flange in a symmetrical array about said shaft in proximity to said second gear.

7. A stepping motor as recited in claim 6 in which each of said electromagnets comprises a core of magnetically permeable material, a coil surrounding said core, and a magnetically permeable pole piece disposed at one end of said core proximate to said second gear.

8. A stepping motor as recited in claim 7 in which said pole pieces are mounted in a common plane extending transversely of said shaft, and further wherein said second gear is secured to said pole pieces.

9. A stepping motor as recited in claim 8 in which each of said pole pieces includes a portion that extends alongside the outer edge of said second gear and terminates proximate to said first gear.

10. A stepping motor as recited in claim 6 in which each of said electromagnets is disposed so that when energized its magnetic field will force said first gear to tilt against said second gear and sequential energization of said electromagnets causes successive teeth of said second gear to be engaged by successive teeth of said first gear with said first gear rotating relative to said second gear and said housing.

11. A stepping motor as recited in claim 6 in which said electromagets are disposed so that successive energization thereof causes successive teeth of said second gear to be momentarily engaged by successive teeth of said first gear and thereby produce rotation of said first gear and said drive shaft.

12. A stepping motor as recited in claim 11 which includes means for successively pulsing said electromagnets.

13. A stepping motor comprising:

a housing having an end wall with an aperture therein;

an electromagnetic assembly mounted within said housing, said electromagnetic assembly including an elongate hollow support member secured to said end wall and having an exterior flange, a plurality of selectively energizable electromagnets each including a magnetically permeable pole piece and means releasably securing said electromagnets to said flange;

a first gear made of non-magnetic material having a plurality of teeth on one face thereof, means attaching said first gear to said electromagnetic assembly so that the toothed side thereof faces away from said electromagnets;

a shaft with a rounded enlargement intermediate its ends, said shaft rotatably mounted within said hollow support member and projecting through said aperture;

a rotatable gear assembly comprising a second gear having a plurality of teeth on one face thereof and a gear post secured to said second gear, said second gear made of magnetic material, said gear post having a through bore which is coaxial with said second gear and is enlarged at one end to form a socket for said rounded enlargement, said gear post mounted on said shaft with the teeth on said second gear facing the teeth on said first gear, said post disposed so that said rounded enlargement is seated in said socket;

spring means mounted on said shaft so as to urge said gear post in a direction to maintain said rounded enlargement in said socket and hold said second gear in close spaced relation to said first gear; and means providing a driving connection between said rounded enlargement and said post so that said gear assembly and said shaft will rotate as a unit while permitting said gear assembly to tilt relative to said shaft, said electromagnets being disposed on said flange so that when any one of said electromagnets is energized its magnetic field will cause said second gear to tilt against said first gear and sequential energization of said electromagnets will cause successive teeth of said first gear to be engaged by successive teeth of said second gear, whereby said gear assembly and shaft are made to rotate relative to said first gear and said housing.

14. A motor according to claim 13 wherein said electromagnets are disposed in a circular array about said tubular member and said pole pieces have enlarged edge portions that extend alongside the outer edge of said first gear so as to minimize the magnetic gap between said pole pieces and said second gear.

15. A motor according to claim 13 wherein each electromagnet comprises a magnetically permeable core, a hollow coil support surrounding said core, and a coil wound on each coil support, each electromagnet disposed so that the axis of each coil extends substantially parallel to the axis of said hollow support member.

16. A motor according to claim 15 wherein said means securing said electromagnets to said flange comprises screw means connecting said cores to said flange.

17. A motor according to claim 15 wherein said pole pieces are secured to said magnets at ends thereof remote from said flange.

18. A motor according to claim 15 wherein said pole pieces and said first gear are secured to said core by screws, with said pole pieces sandwiched between said cores and said first gear.

19. A motor according to claim 13 wherein said spring is a coiled compression spring with one end thereof engaging said second gear, and further including means carried by said shaft engaging and restraining the opposite end of said spring.

References Cited

UNITED STATES PATENTS

| | | | |
|---|---|---|---|
| Re. 22,549 | 9/1944 | Plenser | 310—82 |
| 1,495,784 | 5/1924 | Fereday | 310—82 |
| 2,871,382 | 1/1959 | Bouvier | 310—82 |
| 3,341,725 | 9/1967 | Gifford | 310—80 |
| 3,391,318 | 7/1968 | Hirokawa | 318—138 X |

WARREN E. RAY, Primary Examiner

U.S. Cl. X.R.

310—82